US007120523B2

(12) United States Patent
Muller

(10) Patent No.: US 7,120,523 B2
(45) Date of Patent: Oct. 10, 2006

(54) HYDRAULIC CYLINDER LIFE PREDICTION

(75) Inventor: Thomas P. Muller, Montgomery, IL (US)

(73) Assignee: Caterpillar Inc., Peoria, IL (US)

( * ) Notice: Subject to any disclaimer, the term of this patent is extended or adjusted under 35 U.S.C. 154(b) by 423 days.

(21) Appl. No.: 10/211,496

(22) Filed: Aug. 1, 2002

(65) Prior Publication Data

US 2002/0193924 A1 Dec. 19, 2002

Related U.S. Application Data

(63) Continuation of application No. 09/740,463, filed on Dec. 19, 2000, now abandoned.

(51) Int. Cl.
*F16H 39/02* (2006.01)
*F16K 3/00* (2006.01)

(52) U.S. Cl. ........................ 701/30; 701/35; 123/90.12

(58) Field of Classification Search .................. 701/29, 701/30, 35, 50; 702/184, 185, 188; 123/90.12; 303/9.61, 11, 114.1, 113.3; 73/579; 137/347, 137/565.14, 573, 565.13
See application file for complete search history.

(56) References Cited

U.S. PATENT DOCUMENTS 3,997,887 A * 12/1976 Poynter ...................... 137/806
4,571,994 A 2/1986 Dickey et al. ................ 73/168
5,228,473 A * 7/1993 Zink .......................... 137/347
5,332,366 A * 7/1994 Anderson .................... 417/63
5,463,596 A * 10/1995 Siefken ....................... 367/98
5,471,147 A * 11/1995 Allen et al. ................. 324/635
5,566,091 A 10/1996 Schricker et al. ............. 702/34
5,971,499 A * 10/1999 Pape et al. ................. 303/9.61
5,975,250 A * 11/1999 Brandmeier et al. ... 188/1.11 W
6,173,684 B1 * 1/2001 Buehrle, II et al. ....... 123/90.12
6,256,594 B1 * 7/2001 Yamamoto et al. .......... 702/185
6,267,432 B1 * 7/2001 Stolle .................... 296/107.01
6,349,252 B1 * 2/2002 Imanishi et al. .............. 701/50
6,412,882 B1 * 7/2002 Isono et al. .............. 303/114.1
6,604,057 B1 * 8/2003 Eden et al. ................. 702/104
6,615,639 B1 * 9/2003 Heinzen .......................... 73/7
6,666,784 B1 * 12/2003 Iwamoto et al. ............ 474/109
6,839,957 B1 * 1/2005 Sticht .......................... 29/714

* cited by examiner

*Primary Examiner*—Dalena Tran
(74) *Attorney, Agent, or Firm*—Liza Meyers; James R. Smith; Finnegan,Henderson,Farrobow,Garrett&Dunner

(57) ABSTRACT

Maintenance requirements for hydraulic cylinders used to actuate heavy equipment may be predicted by measuring actual use of the cylinders. Sensors measuring piston position within each cylinder are integrated and the results stored in histograms bins to provide a permanent record of motion. Hydraulic pressure and temperature are also recorded. Data are downloaded periodically and compared with data from laboratory tests and/or from other units in the field.

20 Claims, 2 Drawing Sheets

HYDRAULIC CYLINDER LIFE PREDICTION

This application is a continuation application of U.S. patent application Ser. No. 09/740,483 filed Dec. 19, 2000 now abandoned.

TECHNICAL FIELD

This invention relates to hydraulic cylinders on mobile or stationary equipment and more particularly to data collection of the activity of the cylinders which is used to predict the time remaining before the next service or impending component failure.

BACKGROUND ART

There are numerous advantages to recording operational data for mechanical and electrical systems and components thereof. The availability of electronic devices, more particularly microprocessors or "black boxes" has facilitated the obtention and recordation of such information. Particularly in the area of heavy equipment such as wheel loaders, back hoes, dozers and other moving equipment having implements which are operated through the use of hydraulic cylinders, the accumulation of data on use is very valuable for the prediction of failures, and for the determination of need for routine maintenance and for other out-of-service events.

U.S. Pat. No. 5,987,394 to Takakura et al., granted Nov. 16, 1999, is directed to a system for downloading electronic control units on motor vehicles which is adaptable to different vehicles having different specifications and different numbers of modules.

U.S. Pat. No. 5,748,496 to Takahashi et al., granted May 5, 1998, is directed to a diagnosis system for monitoring the operation of a manufacturing facility in which the system predicts future changes and potential production defects on the basis of sensed information. This information is depicted in a simplified form to expedited a proper response from line employees.

U.S. Pat. No. 5,506,773 to Takaba et al, granted 9 Apr. 1996, is directed to a self-diagnosis system for a motor vehicle and particularly to the storage of data indicating malfunctions and relating them to error codes.

U.S. Pat. No. 5,852,793 to Board et al., granted December 22, 1998, is directed to life cycle measurements of rotating or reciprocating machinery using transducers detecting vibration, friction and shock waves and provides necessary filters to eliminate extraneous data.

The prior art discloses either real time expert systems, event flags which have been "collected" during operation of a vehicle or other device or revert to the time-honored process of simply measuring engine hours. There remains a need for data collection in the field from hydraulic devices which can be related to parameters established in laboratory on a test stand and/or to recorded histories of equivalent hydraulic devices in the field. The present invention is directed to overcoming the problems and disadvantages associated with the prior art as set forth above.

DISCLOSURE OF THE INVENTION

The invention relates to methods for predicting service intervals for hydraulic systems in machinery using pressurized hydraulic cylinders to control various operational functions. Data are collected and compiled from operating parameters including but not limited to position of pistons, total travel of a piston, acceleration and deceleration, fluid pressures and fluid temperatures. Data are collected over discrete intervals reflecting the type of use cycle and may be further processed to indicate average values over a cycle, high and low excursions. Other factors such as ambient temperatures which may relate to the selected operational parameters also may be collected.

Data are periodically downloaded from an electronic storage module and compared to data collected on other similar devices on test stands or from other machinery in the field. Comparisons are used to identify decrements in system performance, specific component deterioration, and to predict time to service and the extent of service required.

BEST MODE FOR CARRYING OUT THE INVENTION

The elements of the invention and the method of their use are applicable to any operating system which uses hydraulic cylinders to move components. For purposes of this invention, the elements and method will be described in terms of a wheel loader, a type of work vehicle having groupings of hydraulic cylinders applied to different functions.

Figure 1:
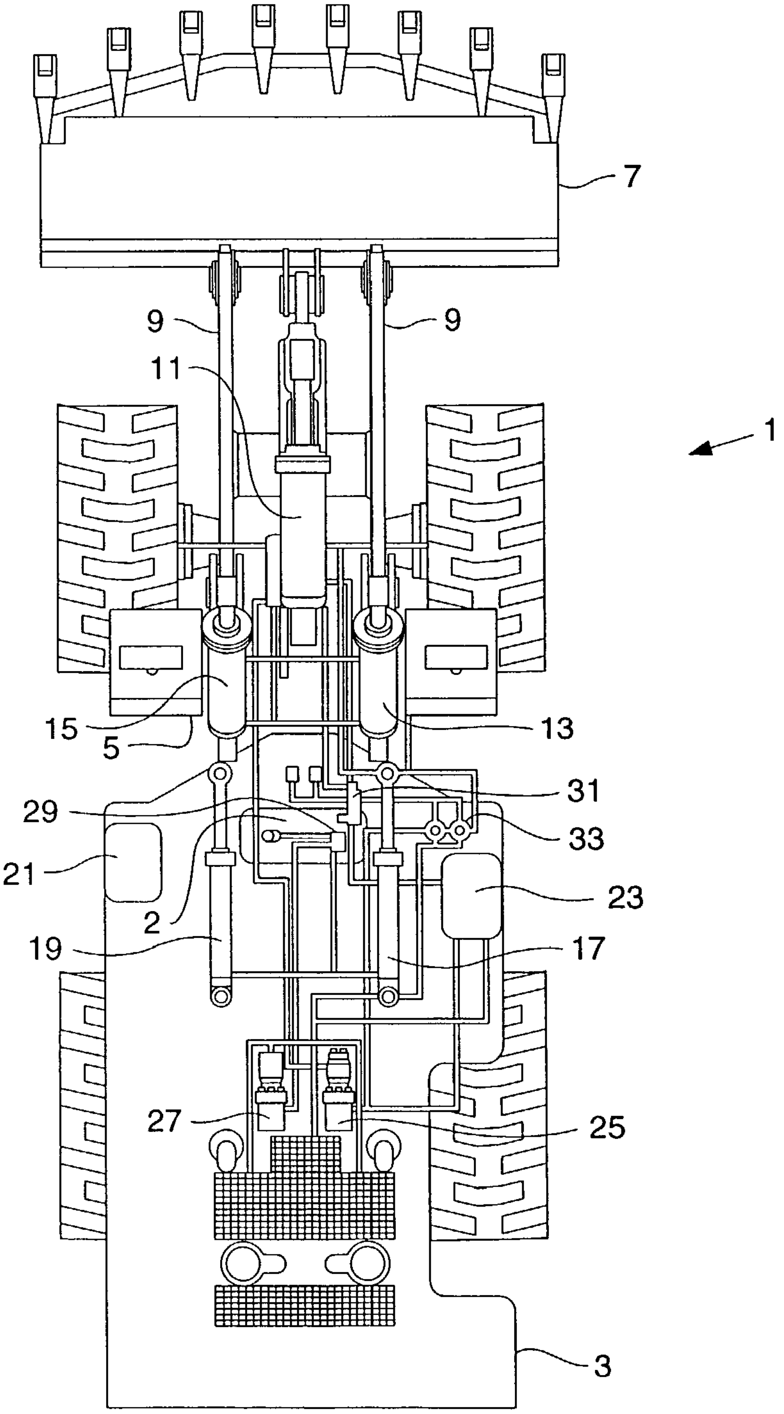
FIG. 1 is a plan view of a wheel loader showing the components of the hydraulic system and the location of hydraulic cylinders to which this invention is directed.

FIG. 1 is a plan view of a typical wheel loader 1. The loader has two basic components articulated at a hitch 2. The engine frame 3 carries engine, transmission and cab (not shown). The loader tower 5 carries bucket 7, lift arms 9, 9', dump cylinder 11, and lift cylinders 13, 15 and is supported by a front axle.

The steering for the loader is accomplished using right steering cylinder 17 and left steering cylinder 19.

The example chosen has two hydraulic systems having separate pressurized oil tanks 21, 23 and hydraulic pumps 25, 27. The number of hydraulic systems is not critical to the invention but the use of two serves to illustrate certain advantages of this invention. The operation of the hydraulic system is controlled by valves such as steering control valve 29, dump control valve 31, and brake control valve 33.

Figure 2:
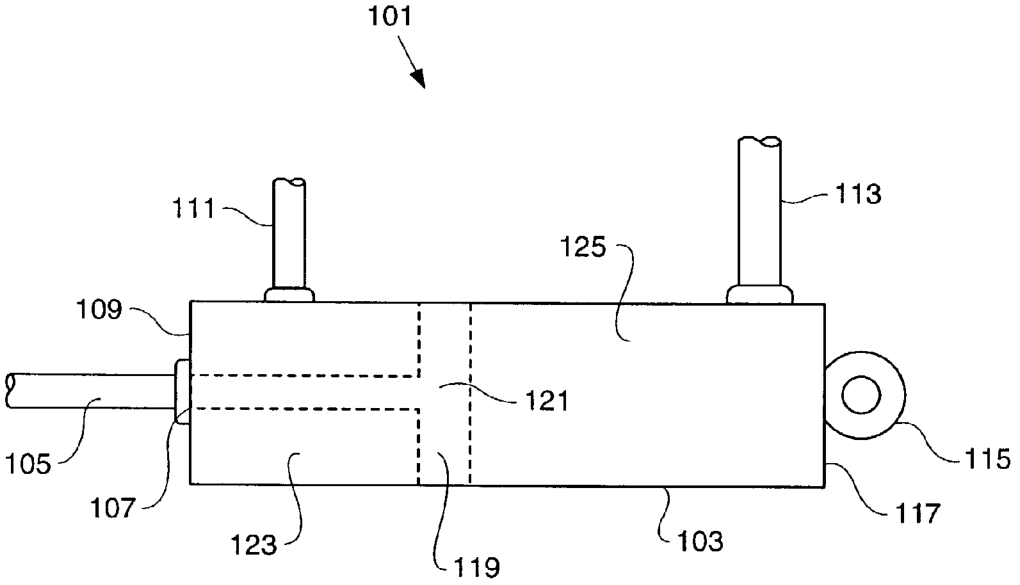
FIG. 2 shows the components of an hydraulic cylinder.

The hydraulic cylinder to which this invention is applied is illustrated in FIG. 2. The cylinder 101 has a housing 103 which typically is circular in cross section. A shaft 105 passes through a seal 107 in end plate 109. The shaft ends in a rod end fitting (not shown) which is moved by movement of the shaft. At the opposite end of the cylinder housing 103 is an ear 115 mounted on a second end plate 117. Hydraulic lines 111, 113 provide paths for hydraulic oil flow to ends of the cylinder. A seal 119 is mounted upon piston 121 and the piston 121 is attached to the shaft 105. The piston 121 divides the cylinder into a return pressure chamber 123 and an extension pressure chamber 125.

The primary measurement useful in predicting the life of a hydraulic cylinder is the total displacement of or "mileage" on the rods. Wear on the seals 107 at the end plate through which the rod passes (109) is caused by abrasion. Wear on the seal 119 on the rod end is also a function of the mileage as the piston moves within the cylinder. In addition, over the stroke of the rod there is inevitable oblique force pushing the rod into misalignment with the cylinder, causing uneven wear and "egging" of the seals and bore holes. Finally, grit is an unavoidable enhancer of wear and, all else being equal, damages as a function of the number of times the grit is rubbed between a seal and a metal surface.

The position of a rod and ultimately the position of the driven component, can be measured in a number of ways which provide electronic signals which can be processed and stored using state-of-the art microprocessors. Included in a list of measurement techniques are rotary position sensors, magnetostrictive sensors, radiofrequency (RF) sensors, captive or floating sliding magnets (linear potentiometers) variable impedance transducers, linear variable displacement transducers (LVDT) and cable displacement transducers (string pot yo-yo's).

Rotary potentiometers are mounted over a linkage pin at the end of a rod to measure the angular rotation of the joint. Using simple trig functions, the angularity is related to the rod extension. Examples of rotary potentiometers used to measure location include U.S. Pat. No. 3,834,345. An example of the use of such a device in determining the position of a bucket of a loader is U.S. Pat. No. 5,727,387.

Magnetostrictive sensors measure the movement of a magnet. The measuring system may be mounted within the cylinder for protection against the external environment or externally on the rod. Commercial systems are available from MTS Systems Corporation, Minneapolis, Minn. and Berlin, Germany, under the tradename TEMPOSINICS® and Balluf, Inc., Florence, Ky., under the tradename MICROPULSE®. These products are integrateable into available Canbus systems to enable both measurement and control.

RF sensors are acoustical sensors which measure the location of the piston within the hydraulic cylinder using reflected sound waves within the cylinder. Because of the geometry of the cylinder, RF sensors treat the cylinder as a resonance chamber and rely upon some frequency shift corrections to reach accurate results. The frequency used and the positions of sender and receiver may be varied and the correlations obtained electronically. Cylinders of a characteristic size and using a specified hydraulic fluid can be carefully tuned and corrected for temperature changes. Some non-limiting examples of the use of RF sensing to determine the position of a piston is an hydraulic cylinder are U.S. Pat. No. 5,710,514 to Crayton et al., which uses sender and sensor located near the end plate 109 and correlates the location of the piston on the basis of a look-up table. U.S. Pat. No. 5,856,745 to Morgan et al. locates the rod support, an extension of the resonance cavity and optionally, the electromagnetic wave couplers, piston stop and hydraulic input-output port within a single mechanical structure at the end of piston travel. The objective is to improve reliability by locating critical components beyond the reach of a piston being "banged" to the end of travel. Banging of the dump cylinder is a technique frequently employed to obtain quantative transfer from a bucket. U.S. Pat. No. 6,119,579 to Pawelski employs an ultrasonic transducer positioned on a side of an hydraulic cylinder and receiving signals resonating within the cylinder. The sending mode is pulsed and then receiving mode analyzes the echoes. The computed result determines position and may be integrated into a control function such as automatic implement positioning.

Linear potentiometers are external analog sensors which move with the rod. They are a type of magnetostrictive sensor and are available form MTS Sensors.

Variable impedance transducers which are available from Automatic Systems Laboratories, Milton Keynes, United Kingdom Linear variable displacement transducers (LVDT) are mutual inductor devices with three coils and a core. LVDT's measure distances fore and aft of a null point by voltage difference.

Cable displacement transducers or string pot yo-yo' are cable actuated sensing devices. A cable rotates a cable drum which in turn rotates a precision potentiometer to provide and output proportional to cable travel. They may be external to the cylinder or internal.

The output from the above-described devices is processed electronically in a microprocessor to produce a result in terms of distance, distance over unit time, or any other result desired including but not limited to strokes, full strokes, partial strokes, acceleration and deceleration rates and percentage of total travel utilized. The results may be displayed in the cab and/or stored in memory and downloaded as desired. Storage may be simplified by recording date in histogram bins reflecting high and low values and one or more mid-range values. Separate bins may reflect discrete units of time over an operational cycle.

Pressure may be measured using pressure transducers or strain gauges anywhere in the hydraulic system. Suitable locations are the pump(s), at the oil tank(s) and at the control valves. Display in the cab or other work station, using a high and lower pressure warning light and/or sound generator, as well as storage of all data in a microprocessor are preferred. Pressure losses or fluctuations indicate one or more of deterioration of a pump, improper ramping of a variable displacement pump, leaking seals, deterioration of hydraulic lines and deterioration or contamination of hydraulic fluid. Drift in pressure over time is a measure of overall system deterioration. Fluctuations over daily cycles may indicate operator inattention, poor technique or overloading.

Hydraulic fluid temperatures may be measured using thermocouples or thermisters. Valuable information is obtained from average temperature as measured at the fluid tank. Extremes indicate whether suitable fluids are being used in consideration of the local temperatures as well as the work load of the vehicle. Excessively high temperatures may indicate overloading or mechanical deterioration (wear). Low temperatures, especially with lower maximum fluid pressure, strongly suggests contamination with lower boiling liquids. Hydraulic fluid temperature is displayed in the cab or other work station and may be coupled with a warning lamp or sound generating device.

The collected data is downloaded periodically to an external recording device through a connector or may be transmitted periodically via satellite to a central location.

INDUSTRIAL APPLICABILITY

When the equipment is started, the position sensors are zeroed by the operator or automatically by microprocessor (ECU). Beginning with start-up, or at a selected time-of-day for equipment operated continuously, a new set of position data is stored. Output from each sensor is recorded individually at pre-established time intervals, usually every 10–20 msec. or serially. Data may be stored as raw data for subsequent processing or divided into groupings indicating piston location. Acceleration data may be stored raw but is preferably sorted into at least three data sets.

When downloaded, the "mileage" on each cylinder is analyzed and compared to standards established during bench testing of each component type. In addition, the results may be compared to that obtained from other units in the field. Service intervals, e.g., time to next service, may be predicted from actual usage data, and costly out-of-service time can be scheduled when actually needed based upon use, not on hours or time since last service. Pressure and temperature readings likewise commence with start-up or periodically for continuously running equipment. These too are downloaded to determine wear and fluid contamination or deterioration. Simple service can be performed when collected data indicate that immediate service should be performed. Fluid purge and fill can be done on the spot if downloaded on site or scheduled as required if reported by satellite. In-frame service can be scheduled based on actual need and parts ordered prior to required service. Comparison with similar equipment in the field may indicate improper selection of equipment, improper operation or manufacturing or engineering problems prior to costly work stoppages or recalls.

Other aspects, objects and advantages of this invention can be obtained from a study of the drawings, the disclosure and the appended claims.

The invention claimed is:

1. A method for operating a hydraulic cylinder, comprising:

sensing a position of a rod of the hydraulic cylinder;

generating a piston travel value based on cumulative rod positions; and indicating a service requirement based on the piston travel value.

2. The method of claim 1, wherein the step of indicating a service requirement includes:

alerting an operator of the service requirement.

3. The method of claim 1, including:

communicating the rod position to a remote device; and generating the service requirement indication via the remote device.

4. A method for operating a hydraulic cylinder comprising:

sensing a position of a rod of the hydraulic cylinder;

producing a rod travel distance signal based on a rod position signal;

comparing the rod travel distance signal with a predetermined value; and determining a service requirement based on the rod travel distance signal and the predetermined value.

5. A method for operating a hydraulic cylinder comprising:

sensing a position of a rod of the hydraulic cylinder;

generating a rod acceleration signal based on the rod position;

comparing the rod acceleration signal with a predetermined value; and determining a service requirement based on the rod acceleration signal and the predetermined value.

6. A work machine, comprising:

a frame;

a power source supported by the frame;

a work implement movable in relation to the frame;

a fluid system including a working fluid, adapted to control movement of the implement, and including at least one cylinder having an extendible rod; and a service requirement diagnosis system associated with the at least one cylinder and adapted to sense at least one operational characteristic of the cylinder based on a position of the rod and at least one of a pressure of the working fluid and a temperature of the working fluid, wherein a service requirement associated with the at least one cylinder is determined based on the position of the rod and at least one of a pressure of the working fluid and a temperature of the working fluid.

7. The work machine of claim 6, wherein the service requirement is conveyed to an operator via an informational device.

8. The work machine of claim 6, wherein the service requirement diagnosis system transmits the at least one operational characteristic to a remote location for the determination of the service requirement.

9. A cylinder assembly comprising:

a piston and rod assembly;

a housing, the piston and rod assembly moveably supported by the housing;

at least one seal provided between the housing and the piston to divide the housing into at least two pressure chambers;

a position sensor adapted to the piston and rod assembly and being operative to detect a position of the piston and rod assembly; and a data processor operative to receive inputs from the position sensor and determine a total stroke distance of the piston and rod assembly.

10. The cylinder of claim 9, wherein the data processor is adapted to notify an operator of a wear condition of the seal dependent upon the total stroke distance of the piston and rod assembly.

11. The cylinder of claim 9, including a pressure sensor adapted to sense a pressure of a hydraulic fluid associated with the piston and rod assembly, wherein a wear condition of the seal is dependent upon the pressure of the hydraulic fluid.

12. The cylinder of claim 11, wherein the data processor is adapted to notify an operator of an upcoming service required based on the pressure.

13. The cylinder of claim 9, including a temperature sensor adapted to sense a temperature of a hydraulic fluid associated with the piston and rod assembly, wherein a wear condition of the seal is dependent upon the temperature of the hydraulic fluid.

14. The cylinder of claim 13, wherein the data processor is adapted to notify an operator of an upcoming service required based on the pressure.

15. A machine comprising:

at least one frame member;

a cylinder assembly including a housing and a piston and rod assembly moveable therein; one of the piston and rod assembly or the housing being attached to the frame and the other of the one of the piston and rod assembly or the housing being attached to a moveable member;

a piston and rod position sensor being adapted to the cylinder assembly, the piston and rod position sensor being operative to determine piston and rod position; and a data processor in communication with the piston and rod position sensor and being operative to determine the total stroke of the piston and rod assembly;

wherein an indication of seal wear is generated corresponding to a predetermined total stroke of the piston and rod assembly being achieved.

16. The machine of claim 15, including a pressure sensor adapted to sense a pressure condition of the cylinder, wherein an indication of a service requirement is generated based on the pressure condition.

17. The machine of claim 15, including a temperature sensor adapted to sense a temperature condition of thecylinder, wherein an indication of a service requirement is generated based on the temperature condition.

18. The machine of claim 15, wherein the data processor is adapted to communicate with a remotely located data processor via transmission.

19. A method for operating a work machine, the machine including at least one pressurizable cylinder assembly adapted to cause movement of at least one portion of the machine, the method comprising:

measuring movement of a piston within the cylinder;

determining the total stroke distance traveled by the piston; and indicating a measure of seal wear based on the total stroke distance of the piston.

20. The method of claim 19, further comprising indicating the measure of seal wear after a predetermined total stroke distance has been achieved.

* * * * *